(12) United States Patent
Hutchette et al.

(10) Patent No.: US 7,705,094 B2
(45) Date of Patent: Apr. 27, 2010

(54) POLYMERISATION CONTROL PROCESS

(75) Inventors: Sebastien Hutchette, Martigues (FR);
Patrick Leaney, Bouc Bel Air (FR);
Frederic Morterol, Sausset les Pins (FR)

(73) Assignee: Ineos Europe Limited, Hampshire (GB)

( * ) Notice: Subject to any disclaimer, the term of this patent is extended or adjusted under 35 U.S.C. 154(b) by 0 days.

(21) Appl. No.: 12/081,035

(22) Filed: Apr. 9, 2008

(65) Prior Publication Data

US 2009/0030164 A1    Jan. 29, 2009

Related U.S. Application Data

(63) Continuation of application No. 11/783,425, filed on Apr. 9, 2007, now abandoned, which is a continuation of application No. 10/495,878, filed as application No. PCT/GB02/04779 on Oct. 22, 2002, now abandoned.

(30) Foreign Application Priority Data

Nov. 19, 2001    (EP) .................................. 01430034

(51) Int. Cl.
*C08F 2/00* (2006.01)
*C08F 10/14* (2006.01)
*C08F 110/02* (2006.01)

(52) U.S. Cl. ............... 526/59; 526/68; 526/71; 526/348.5; 526/352; 526/352.2

(58) Field of Classification Search .................. 526/59, 526/68, 71, 348.5, 352, 352.2
See application file for complete search history.

(56) References Cited

U.S. PATENT DOCUMENTS 5,494,871 A * 2/1996 Brun et al. .................. 502/108
6,884,856 B2   4/2005 Benazouzz et al.

FOREIGN PATENT DOCUMENTS

| EP | 0 770 629 | 5/1997 |
|---|---|---|
| WO | WO 99/15534 | 4/1999 |
| WO | WO 00 32651 | 6/2000 |
| WO | WO 01 44313 | 6/2001 |

* cited by examiner

*Primary Examiner*—William K Cheung
(74) *Attorney, Agent, or Firm*—Nixon & Vanderhye

(57) ABSTRACT

The present invention relates to a process for controlling the gas-phase co-polymerisation of olefins in a fluidised bed reactor. The present invention further relates to a method for the continuous gas-phase (co-)polymerisation of olefins in a fluidised bed reactor in the presence of a polymerisation catalyst wherein the density SPAN of the polymer powder particles leaving the reactor is maintained below certain values throughout the polymerisation.

4 Claims, No Drawings

POLYMERISATION CONTROL PROCESS

RELATED APPLICATION

This application is a continuation of U.S. application Ser. No. 11/783,425, filed Apr. 9, 2007, which is a continuation of U.S. application Ser. No. 10/495,878, filed May 18, 2004, which is a §371 of International Application No. PCT/GB02/04779, filed Oct. 22, 2002, which claims priority of European Patent Application No. EP 01430034.7, filed Nov. 19, 2001, the contents of all of which are incorporated herein by reference.

The present invention relates to a process for controlling the gas-phase co-polymerisation of olefins in a fluidised bed reactor. The present invention further relates to a method for the continuous gas-phase (co-)polymerisation of olefins in a fluidised bed reactor in the presence of a polymerisation catalyst wherein the density SPAN of the polymer powder particles leaving the reactor is maintained below certain values throughout the polymerisation.

Processes for the co-polymerisation of olefins in the gas phase are well known in the art. Such processes can be conducted for example by introducing the gaseous monomer and comonomer into a stirred and/or gas fluidised bed comprising polyolefin and a catalyst for the polymerisation.

In the gas fluidised bed polymerisation of olefins, the polymerisation is conducted in a fluidised bed reactor wherein a bed of polymer particles is maintained in a fluidised state by means of an ascending gas stream comprising the gaseous reaction monomer. The start-up of such a polymerisation generally employs a bed, of polymer particles similar to the polymer which it is desired to manufacture. During the course of polymerisation, fresh polymer is generated by the catalytic polymerisation of the monomer, and polymer product is withdrawn to maintain the bed at more or less constant volume. An industrially favoured process employs a fluidisation grid to distribute the fluidising gas to the bed, and to act as a support for the bed when the supply of gas is cut off. The polymer produced is generally withdrawn from the reactor via a discharge conduit arranged in the lower portion of the reactor, near the fluidisation grid. The fluidised bed consists in a bed of growing polymer particles. This bed is maintained in a fluidised condition by the continuous upward flow from the base of the reactor of a fluidising gas.

The polymerisation of olefins is an exothermic reaction and it is therefore necessary to provide means to cool the bed to remove the heat of polymerisation. In the absence of such cooling the bed would increase in temperature and, for example, the catalyst becomes inactive or the bed commences to fuse. In the fluidised bed polymerisation of olefins, the preferred method for removing the heat of polymerisation is by supplying to the polymerisation reactor a gas, the fluidising gas, which is at a temperature lower than the desired polymerisation temperature, passing the gas through the fluidised bed to conduct away the heat of polymerisation, removing the gas from the reactor and cooling it by-passage through an external heat exchanger, and recycling it to the bed. The temperature of the recycle gas can be adjusted in the heat exchanger to maintain the fluidised bed at the desired polymerisation temperature. In this method of polymerising alpha olefins, the recycle gas generally comprises the monomer and comonomer olefins, optionally together with, for example, an inert diluent gas such as nitrogen or a gaseous chain transfer agent such as hydrogen. Thus, the recycle gas serves to supply the monomer to the bed, to fluidise the bed, and to maintain the bed at the desired temperature. Monomers consumed by the polymerisation reaction are normally replaced by adding make up gas or liquid to the polymerisation zone or reaction loop.

A gas fluidised bed polymerisation reactor is typically controlled to achieve a desired melt index and density for the polymer at an optimum production and temperature.

The Applicants have now found that the use of more stringent process operating conditions or new polymerisation catalyst systems may cause problem to the polymerisation operations, particularly for high space-time yield polymerisation processes. One of the main and recurrent problem encountered is the formation of polymer agglomerates. The Applicants believe that controlling the density SPAN of the polymer powder particles can successfully solve theses problems.

The polymer sintering temperature varies with the polymer properties and is particularly sensitive to density. It has been found that the improvement provided by this invention in the control of the polymer density instantaneously produced at any point within the polymerisation zone is also particularly significant in the quest of optimising the final product properties.

Thus, according to the present invention, there is provided a process for controlling a continuous fluidised bed reactor (co-)polymerisation process which comprises:

1. withdrawing from the reactor a hot recycle stream comprising a principal monomer and at least another unreacted reactant, 2. cooling part or all of said recycle stream withdrawn from said reactor, and 3. recycling part or all of said cooled recycle stream comprising the principal monomer and the unreacted reactant(s) through the polymerisation zone in said reactor in the presence of a polymerisation catalyst under reactive conditions, characterised in that the said controlling process consists in controlling the density SPAN of the polymer powder particles.

According to a preferred embodiment of the present invention, the density SPAN of the polymer powder particles is maintained below 0.0028, preferably below 0.0025, more preferably below 0.0023.

According to another preferred embodiment of the present invention, it has been found that the claimed control, i.e. the maintenance of the density SPAN below certain values, was highly critical for those catalysts that produce a density SPAN of the polymer powder particles higher than 0.0035, preferably higher than 0.004, under the following polymerisation conditions:

a. Ethylene-hexene-1 copolymer production in a continuous gas phase fluidised bed reactor
b. polymerization operating temperature of 72° C.
c. polymerization operating pressure of 20 bars
d. no condensation rate
e. melt index (2.16) of the polymer produced equal to 1.2 (as measured according to ASTM-D-1238/method B
f. density of the polymer produced equal to 0.918 g per cm3 (annealed/as measured according to ASTM-D-2839).

According to a further preferred embodiment of the present invention, it has been found that the claimed control, i.e. the maintenance of the density SPAN below certain values, was highly critical for the metallocene catalysts.

According yet to a further preferred and particularly pertinent embodiment of the present invention, it has been found that the claimed control, i.e. the maintenance of the density SPAN below certain values, was particularly relevant when high polymerisation production rates were achieved, e.g. with rates equal to or higher than 100 kg of polymer per hour, preferably higher than 150 kg/hour.

While not wishing to be bound by a theory, the Applicants believe that the benefits of the present invention are less relevant to smaller scale operations because of the more efficient mixing and heat removal capacity encountered with smaller equipment as explained hereafter. It is well known in the art of fluidisation that smaller scale fluid beds are thoroughly stirred by large bubbles whose diameter is comparable to that of the vessel. This behaviour is described in the literature as the slugging regime and characterised by the fact that these large bubbles with respect to the vessel diameter efficiently scrape its walls from any deposits of sticky powders. It is also known that bubbles reach a maximum diameter beyond which they split into smaller bubbles whatever the vessel diameter is provided that it is larger than the maximum bubble diameter. Hence in a larger vessel bubbles tend to gather in the middle of the vessel and powder entrained in the wake of the bubbles flows back downwards at the reactor wall: this is known in the literature as the core-annulus model. From this model bubbles have hence a much lower probability to efficiently scrape the walls from any deposits of sticky powders.

It is a further embodiment of the present invention to achieve the above control process in order to achieve a constant melt index of the polymer particles produced.

It is a further embodiment of the present invention to achieve the above control process through the control of the condensation rate.

It is yet a further embodiment of the present invention to achieve the above control process through the control of the polymerization temperature.

It is yet a further embodiment of the present invention to achieve the above control process wherein the principal monomer is ethylene or propylene, preferably ethylene.

The density can be measured according to ASTM-D-2839.

For the purposes of the present invention and appended claims, the density SPAN of the polymer powder particles means the absolute value of the density difference in g/cm3 between either A. the average density of the material with particle size above the X% cumulative volume of the volume/particle size distribution of the (aggregate) polymer particles exiting the reactor and the average density of all the said (aggregate) polymer particles exiting the reactor, or B. the average density of the material with particle size below the Y% cumulative volume of the volume/particle size distribution of the (aggregate) polymer particles exiting the reactor and the average density of all the said (aggregate) polymer particles exiting the reactor, or C. the average density of the material with particle size above the X% cumulative volume of the volume/particle size distribution of the (aggregate) polymer particles exiting the reactor and the average density of the material with particle size below the Y% cumulative volume of the volume/particle size distribution of the (aggregate) polymer particles exiting the reactor, X being comprised between 51 and 99, preferably 80 and 99, more preferably 90 and 99, and Y being comprised between 49 and 1, preferably 20 and 1, more preferably 10 and 1.

Any conventional means for example a Malvern or a mesh sieving technique can measure the volume/particle size distribution.

For the purposes of the present invention and appended claims, the measurement of the volume/particle size distribution was made according to ASTM-D-1921 sieving technique.

For the purposes of the present invention and appended claims, the polymerisation zone means the reaction zone consisting of the fluidised bed (where most of the solids are typically well mixed), and (if any) in the region above the fluidised bed which consists of the powder disengagement zone and/or the velocity reduction zone (where the solids can, typically, be less well mixed).

The hot recycle stream withdrawn from the reactor comprises unreacted gaseous (co)monomers, and optionally, inert hydrocarbons, inert gases such as nitrogen, reaction activators or moderators such as hydrogen, as well as entrained catalyst and/or polymer particles.

The cooled recycled stream fed to the reactor additionally comprises make-up reactants (gaseous or liquid) to replace those reactants polymerised in the polymerisation zone.

The process according to the present invention is particularly suitable for the manufacture of polymers in a continuous gas fluidised bed process.

Illustrative of the polymers which can be produced in accordance with the invention are the following:

SBR (polymer of butadiene copolymerised with styrene),

ABS (polymer of acrylonitrile, butadiene and styrene), nitrile (polymer of butadiene copolymerised with acrylonitrile), butyl (polymer of isobutylene copolymerised with isoprene), EPR (polymer of ethylene with propylene), EPDM (polymer of ethylene copolymerised with propylene and a diene such as hexadiene, dicyclopentadiene or ethylidene norborene), copolymer of ethylene and vinyltrimethoxy silane, copolymer of ethylene and one or more of acrylonitrile, maleic acid esters, vinyl acetate, acrylic and methacrylic acid esters and the like In an advantageous embodiment of ibis invention, the polymer is a polyolefin preferably copolymers of ethylene and/or propylene and/or butene. Preferred alpha-olefins used in combination with ethylene and/or propylene and/or butene in the process of the present invention are those having from 4 to 8 carbon atoms. However, small quantities of alpha olefins having more than 8 carbon atoms, for example 9 to 40 carbon atoms (e.g. a conjugated diene), can be employed if desired. Thus it is possible to produce copolymers of ethylene and/or propylene and/or butene with one or more $C_4$-$C_8$ alpha-olefins. The preferred alpha-olefins are but-1-ene, pent-1-ene, hex-1-ene, 4-methylpent-1-ene, oct-1-ene and butadiene. Examples of higher olefins that can be copolymerised with the primary ethylene and/or propylene monomer, or as partial replacement for the $C_4$-$C_8$ monomer are dec-1-ene and ethylidene norbornene. According to a preferred embodiment, the process of the present invention preferably applies to the manufacture of polyolefins in the gas phase by the copolymerisation of ethylene with but-1-ene and/or hex-1-ene and/or 4MP-1.

The process according to the present invention may be used to prepare a wide variety of polymer products for example polypropylene, linear low density polyethylene (LLDPE) based on copolymers of ethylene with but-1-ene, 4-methylpent-1-ene or hex-1-ene and high density polyethylene (HDPE) which can be for example copolymers of ethylene with a small portion of higher alpha olefin, for example, but-1-ene, pent-1-ene, hex-1-ene or 4-methylpent-1-ene.

The process according to the present invention is especially useful for the preparation of copolymers of ethylene showing a density comprised between 0.880 and 0.925 g/cm3.

When liquid condenses out of the recycle gaseous stream, it can be a condensable monomer, e.g. but-1-ene, hex-1-ene, 4-methylpent-1-ene or octene used as a comonomer, and/or an optional inert condensable liquid, e.g. inert hydrocarbon(s), such as $C_4$-$C_8$ alkane(s) or cycloalkane(s), particularly butane, pentane of hexane.

The process is particularly suitable for polymerising olefins at an absolute pressure of between 0.5 and 6 MPa and at a temperature of between 30° C. and 130° C. For example for LLDPE production the temperature is suitably in the range 75-100° C. and for HDPE the temperature is typically 80-115° C. depending on the activity of the catalyst used and the polymer properties desired.

The polymerisation is preferably carried out continuously in a vertical fluidised bed reactor according to techniques known in themselves and in equipment such as that described in European patent application EP-0 855 411, French Patent No. 2,207,145 or French Patent No. 2,335,526. The process of the invention is particularly well suited to industrial-scale reactors of very large size.

The apparatus can comprise essentially a fluidised-bed polymerisation reactor comprising a vertical cylinder equipped with a fluidisation grid and supporting a disengagement chamber, a conduit for recycling the gas mixture, connecting the top of the disengagement chamber to the base of the reactor, which recycle conduit is provided with at least one heat exchanger and a gas compressor and with a conduit for introducing alpha-olefins. During the course of the polymerisation the bed comprises catalyst particles, growing polymer particles and formed polymer particles. The bed is maintained in a fluidised state by introducing a fluidising medium at a sufficient flow rate to cause the particles to separate and act as a fluid. The fluidising medium may consist of a single phase e.g a gas phase or it may be two phase for example it may consist of a gas phase and a liquid phase, for example, a mixture of gas and entrained liquid. In such a case the quantity of liquid in the gas phase may be about from 1-50 weight percent, for example 10-20 weight percent, preferably less than 15 weight percent, provided always that the velocity of the two-phase fluidising medium is high enough to keep the liquid phase in suspension in the gas and to support the fluidised bed in the reactor. The two-phase fluidising medium of gas and entrained liquid may be formed by cooling part or all of the unreacted fluids from the reactor below the dew point and re-introducing said two-phase mixture into the reactor. Alternatively a two-phase fluidising medium may be formed within the reactor, for example by separately injecting e.g underneath a fluisisation grid or directly into the fluidised bed, gas and liquid under conditions which will produce a two-phase fluidising medium. A single phase fluidising medium or a substantially single phase fluidising medium such as a gas phase fluidising medium may be formed by cooling a recycle gaseous stream to a temperature sufficient to form a liquid and a gas and by separating the liquid from the gas and then feeding the gas into the reactor, for example by injection below the fluidisation grid.

Alternatively, the recycle gaseous stream may be divided into a first stream and a second stream. The first stream is passed directly to the reactor in a conventional way by injection below the fluidisation grid and the second stream is cooled and the stream is separated into a gas and liquid stream. The gas stream may be returned to the first stream and re-introduced into the reactor below the bed, for example, below the fluidisation grid if such a grid is employed.

The fluidising medium may contain unreacted gaseous monomers, make-up monomers to replace monomers consumed by the polymerisation reaction, and optionally inert hydrocarbons e.g ethane, propane, butane, isobutane or isopentane, inert gases such as nitrogen, reaction activators or moderators e.g hydrogen.

The fluidisation grid positioned above the point of recycle ensures proper distribution of the fluidising medium to the bed and acts as a support for the bed when the supply of gas is cut off.

The polymerisation reaction may be carried out in the presence of a catalyst system of the Ziegler-Natta type, said catalyst essentially comprising a compound of a transition metal.

High-activity catalyst systems have already been known for a number of years and are capable of producing large quantities of polymer in a relatively short time, and thus make it possible to avoid a step of removing catalyst residues from the polymer. These high-activity catalyst systems generally comprise a solid catalyst consisting essentially of atoms of transition metal (preferably titanium and/or vanadium and/or zirconium), of magnesium and of halogen.

The Ziegler-Natta type catalyst can be used directly as such or in the form of a prepolymer. The conversion to prepolymer is generally carried out by bringing the catalyst into contact with one or more alpha-olefins in amounts such that the prepolymer contains between 0.002 and 10 millimol of transition metal per gram.

A co-catalyst may also be advantageously used with the Ziegler-Natta catalyst such as organometallic compounds of metals belonging to Groups I, II or III of the Periodic Table of the elements, in particular organoaluminium compounds.

The process is also particularly suitable for use with Ziegler catalysts supported on silica. Preferred catalyst systems for use in the present invention are those disclosed in WO9309147, WO9513873, WO9534380 and WO9905187, the content of which is hereby incorporated by reference.

The polymerisation reaction may also be carried out using a metallocene type catalyst such as those described in EP 0 129368, EP 0 206794, EP 0 420436 and EP 0 416815 the subject matter of which is incorporated herein by reference.

It is also possible to use late transition metal e.g platinum or palladium, catalyst complexes such as those described in WO 9623010 the subject matter of which is incorporated herein by reference.

The process can also be applied with the iron and/or cobalt complexes catalysts, e.g. such as those disclosed in WO98/27124 or in WO99/12981.

It is also possible to use a high-activity catalyst consisting essentially of a chromium oxide activated by a heat treatment and associated with a granular or microspheroidal support based on a refractory oxide. This high activity chromium catalyst may be modified by the presence of titanium or aluminium of fluorine The catalyst may suitably be employed in the form of a prepolymer powder prepared beforehand during a prepolymerisation stage with the aid of a catalyst as described above. The prepolymerisation may be carried out by any suitable process, for example, polymerisation in a liquid hydrocarbon diluent or in the gas phase using a batch process, a semi-continuous process or a continuous process.

For details on prepolymerisation see U.S. Pat. Nos. 4,923,833, 5,283,278 and 4,921,825 and EP-B-0279 863 all of which are herein fully incorporated by reference.

In another embodiment of the invention, the catalyst system of the invention includes an antistatic agent, for example, those described in U.S. Pat. No. 5,283,278, which is fully incorporated herein by reference. Non-limiting examples of antistatic agents include, alcohol, thiol, silanol, diol, ester, ketone, aldehyde, acid, amine, and ether compounds. Tertiary amines, ethoxylated amines, and polyether compounds are preferred. The antistatic agent can be added at any stage in the formation of the supported catalyst system of the invention.

In another embodiment of the invention, the catalyst system of the invention includes a polyolefin wax or tackifier or the like.

The catalyst may also be injected directly into the reaction zone as a dry solid or in suspension in a condensable monomer, e.g. but-1-ene, hex-1-ene, 4-methylpent-1-ene, cyclooctene, 1-pentene or octene and/or an optional inert condensable liquid, e.g. inert hydrocarbon(s), such as $C_4$-$C_8$ alkane(s) or cycloalkane(s), particularly butane, pentane or hexane.

Catalysts that may also be suitably employed in the present invention are unsupported liquid catalyst.

A further benefit of the present invention is to improve the speed and safety associated with start-ups and grade transitions. When changing grades, the compositions of monomers and hydrogen and the product properties may be changing continuously, the quantity of absorption of monomers in the polymer will additionally be altered by the changing product properties (principally density) and gas composition. The control of the SPAN according to the present invention enables the speed of start-ups and transitions to be improved and the production of wide-specification material to be minimised.

COMPARATIVE EXAMPLE 1

The process is carried out in a fluidised bed gas phase polymerisation reactor consisting of a vertical cylinder of diameter 0.75 m and height 5 m and surmounted by a velocity reduction chamber. In its lower part, the reactor is equipped with a fluidisation grid and an external line for recycling gas, connecting the top of the velocity reduction chamber to the lower part of the reactor situated under the fluidisation grid. The gas recycling line is equipped with a compressor and with a heat transfer means. Opening into the gas recycling line there are, in particular, the feed lines for ethylene, pentane, 1-hexene, hydrogen and nitrogen, which represent the main constituents of the gas reaction mixture passing through the fluidised bed.

Above the fluidisation grid the reactor contains a fluidised bed consisting of a linear low density polyethylene powder. The gas reaction mixture, which contains ethylene (1.2 MPa), 1-hexene (0.0048 MPa), hydrogen (0.00348 MPa), pentane (0.2 Mpa) and nitrogen and other minor components passes through the fluidised bed at a pressure of 2.4 MPa, at 75° C. and with an upward fluidisation velocity of 0.4 m/s.

The polymerisation reactor is fitted with three sets of wall temperature indicators at 0.5 m, 1.0 m and 1.5 m above the fluidisation grid.

The catalyst used is a metallocene catalyst prepared according to Example 17 of WO98/27119.

Catalyst is injected at a rate of 40 g/h. Under these conditions (75° C., 2.4 MPa, 0.4 m/s) a linear low density polyethylene with a density of 0.918, a melt index of 1.3 g/10 minutes under a 2.16-kg load at 190° C. is manufactured at an output which stabilizes at 120 kg/h, one day after the start of the reaction. It is noticed that it is necessary to increase hexene to ethylene feedrate ratio to 0.14 Kg of hexene per Kg of ethylene to get the product in the above specification. 36 hours after initial-reaction small agglomerates begin to appear: their shape is irregular, a few cm in diameter. They are constituted by sintered powder and their composition is very different to that of the bed: their density is 0.914, a melt index of 0.5 g/10 minutes under a 2.16-kg load at 190° C. As the run progresses the quantity of agglomerates increases to a level such that the product removal is blocked. The increase of agglomerates is shown by the fact that the amount of coarse particles above 1600µ increases beyond 25% in weight. Finally the run is stopped by a defluidisation of the bed caused by the accumulation of agglomerates on the grid. The reactor shutdown is necessary to remove the large agglomerates deposited on the grid.

The analysis of the powder shows 7 percent fractions under 300µ whose density is 0.91. The density span (as measured according to the definition C with X=90 and Y=10) measured by sieving was 0.008.

EXAMPLE 2

Example 1 was repeated excepted that the temperature was increased to 83 deg C. and the production rate increased to 150 kg/hr.

Catalyst is injected at a rate of 50 g/h. A linear low density polyethylene with a density of 0.918, a melt index of 1.3 g/10 minutes under a 2.16-kg load at 190° C. is manufactured at an output which stabilizes at 150 kg/b, one day and a half after the start of the reaction. It is noticed that the hexene to ethylene feedrate ratio required to get the product in the above specification is only 0.115 Kg of hexene per Kg of ethylene. The process operation is very smooth without any agglomerates. The powder analysis shows that the fraction of powder under 300µ is less than 3% and that its density is above 0.916. The coarse particle fraction above 1600µ is less than 2% in weight. The density span measured by sieving is 0.004

EXAMPLE 3

Example 2 was repeated except a higher production rate was targeted with a condensation level in the reactor of 8% wt in relation to the circulating gas.

Catalyst is injected at a rate of 80 g/h. A linear low density polyethylene with a density of 0.918, a melt index of 1.3 g/10 minutes under a 2.16-kg load at 190° C. is manufactured at an output which stabilizes at 250 kg/h, two days after the start of the reaction. The process operation is very smooth without any agglomerates. The powder analysis shows that the fraction of powder under 300µ is less than 3% and that its density is above 0.916. The coarse particle fraction above, 1600µ is less than 2% in weight. The density span measured by sieving is 0.0025

The invention claimed is:

1. A (co-)polymerization process which comprises:
   (i) continuously (co-)polymerizing a principal monomer in a polymerization zone of a fluidized bed reactor in the presence of a metallocene polymerization catalyst under reactive conditions to form polymer powder particles;
   (ii) withdrawing polymer powder particles from the reactor;
   (iii) withdrawing from the continuous (co-)polymerization process a hot recycle stream containing the principal monomer and at least another unreacted reactant;
   (iv) cooling part or all of said recycle stream withdrawn from said reactor to a temperature sufficient to form a liquid and a gas; and
   (v) recycling said cooled recycle stream containing the principal monomer and the at least another unreacted reactant through the polymerisation zone in said reactor, wherein a density SPAN of the polymer powder particles formed is at or below 0.0025, the density SPAN of the polymer powder particles formed being the absolute value of the density difference in g/cm³ between the average density of polymer powder particles with a particle size above 90% cumulative volume of the volume/particle size distribution of the (aggregate) polymer particles withdrawn from the reactor and the average density of polymer powder particles with a particle size below 10% cumulative volume of the volume/particle size distribution of the (aggregate) polymer particles withdrawn from the reactor.

2. The process according to claim 1, wherein the principal monomer is ethylene or propylene.

3. The process according to claim 2, wherein the principal monomer is ethylene.

4. The process according to claim 1, wherein the density SPAN of the polymer powder particles is at or below 0.0023.

* * * * *